United States Patent Office 3,131,525
Patented May 5, 1964

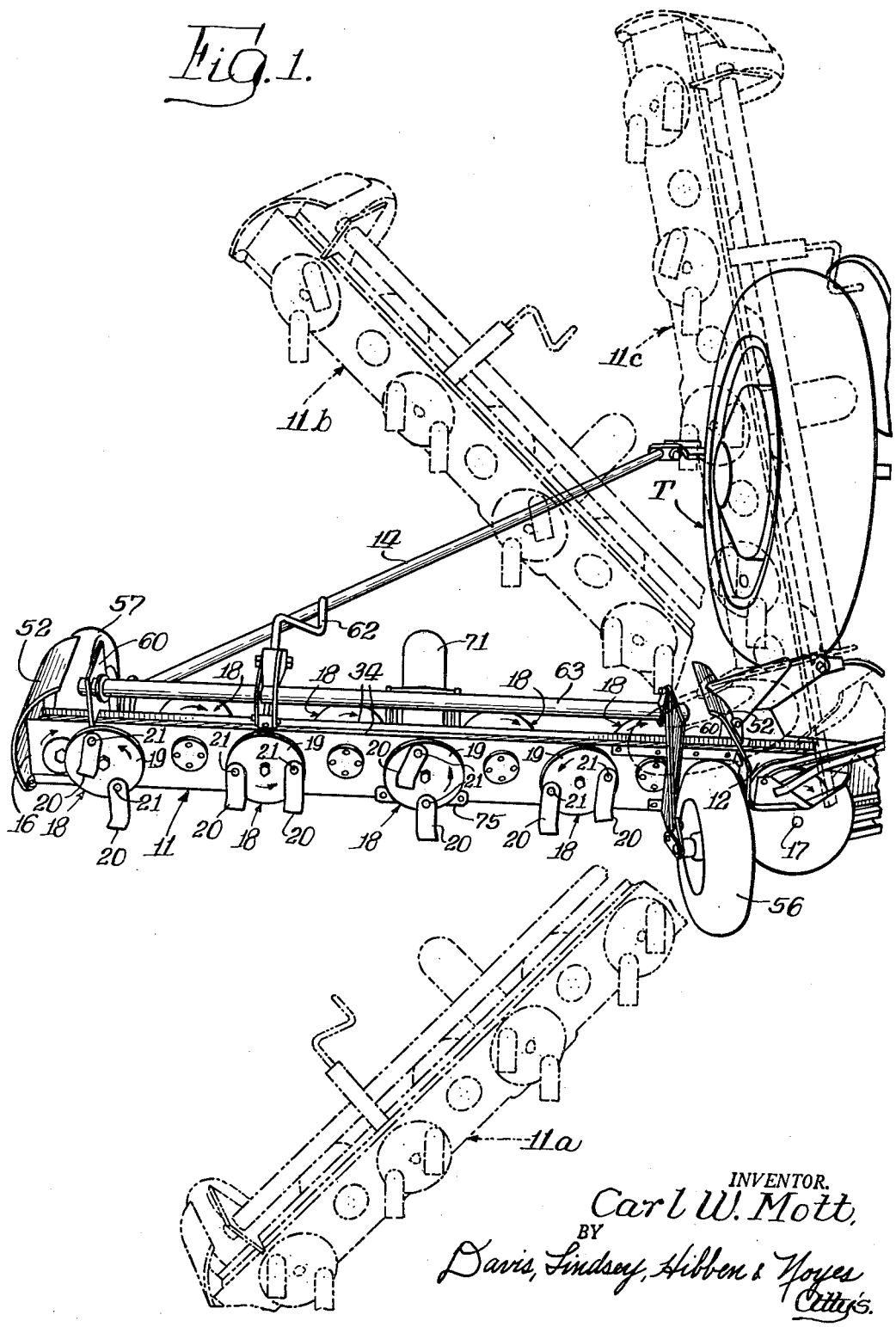

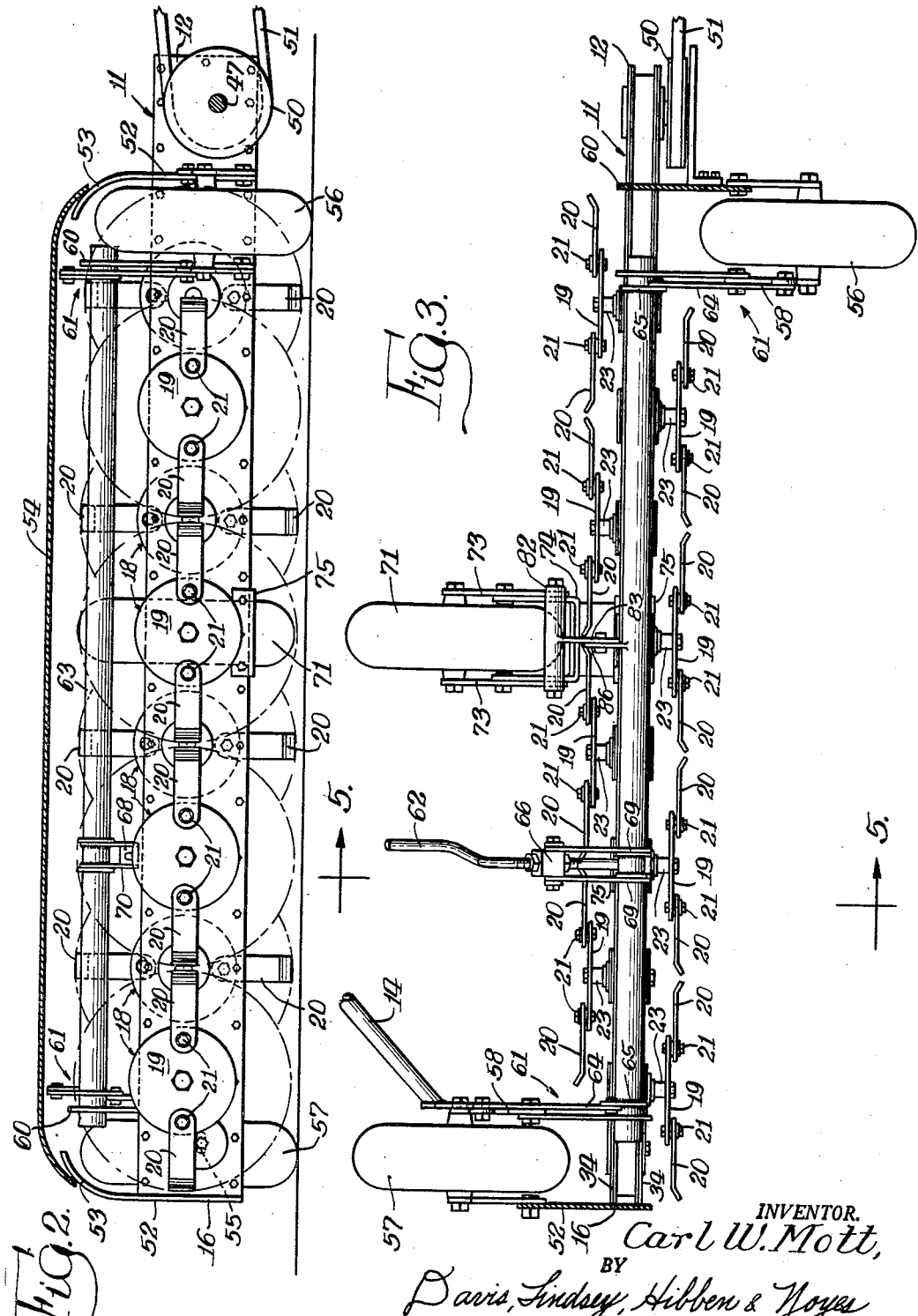

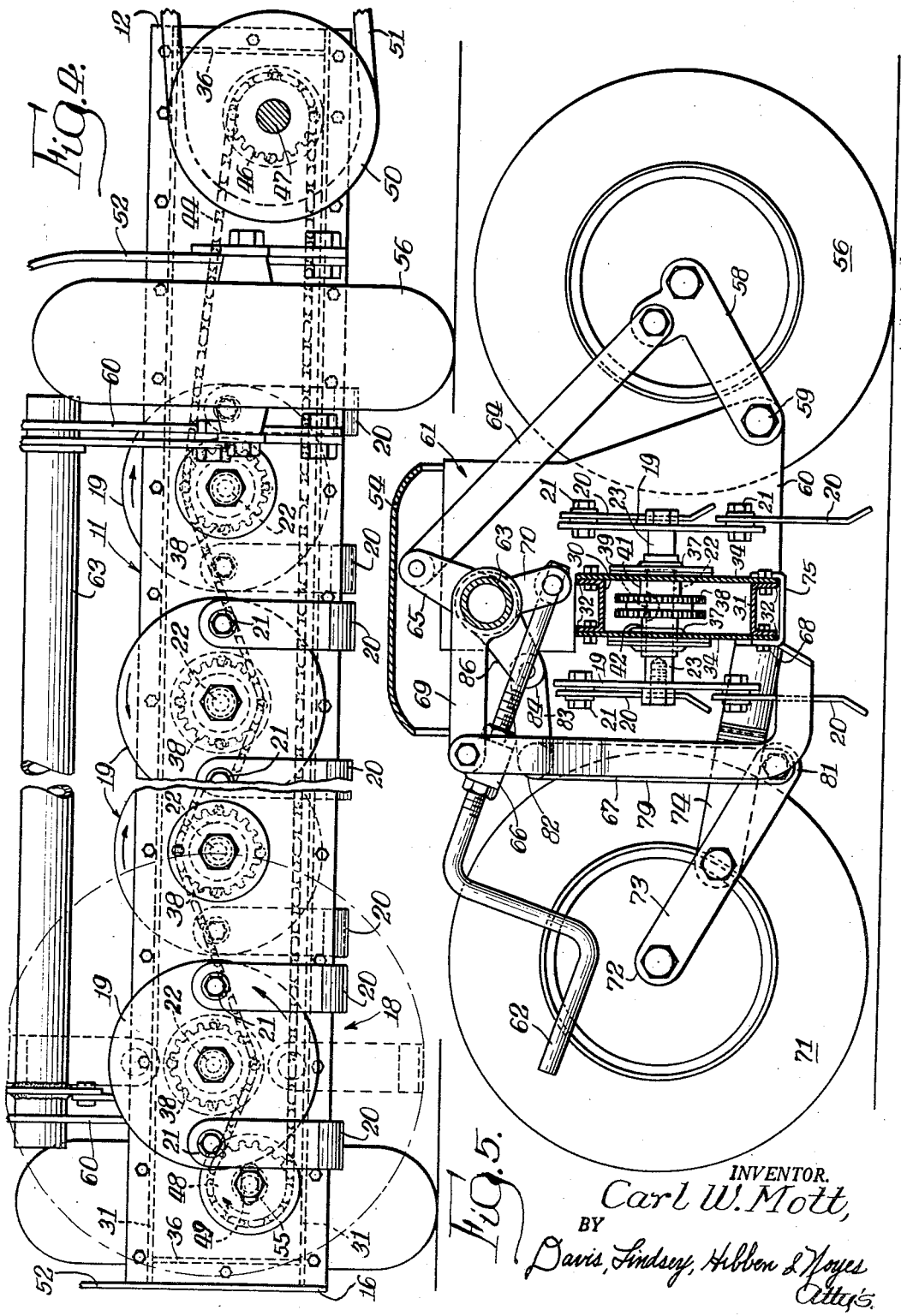

3,131,525
DISK TYPE MOWER ROTATING ON A
HORIZONTAL LONGITUDINAL AXIS
Carl W. Mott, Lake Ozark, Mo., assignor to Mott
Corporation, Brookfield, Ill., a corporation of Illinois
Filed June 19, 1961, Ser. No. 117,882
24 Claims. (Cl. 56—25.4)

This invention relates to mowers, and more particularly to a mower adapted for mowing irregular surfaces and where solid obstacles may be encountered.

Accordingly, it is a general object of the present invention to provide a novel mower of the foregoing character.

Another object is to provide a mower having a novel blade arrangement and mounting which protects the blades from damage upon contact with a solid object.

Still another object is to provide a mower of the foregoing character having a novel drive means and lubrication system.

A further object is to provide a mower having a novel wheel arrangement which permits operation of the mower over irregular surfaced terrains.

A more specific object is to provide a novel mower that is particularly adapted for mowing a shoulder adjacent a highway, whether the shoulder is level with the highway or is inclined relative to the highway.

Other objects and advantages will be apparent from the following description and accompanying sheets of drawings in which:

FIGURE 1 is a fragmentary perspective view of a mower embodying the features of the present invention as the latter would appear when connected to a tractor, and showing the mower, in full and dotted lines, in various operating positions;

FIG. 2 is an enlarged front elevational view of the mower illustrated in FIG. 1;

FIG. 3 is a top plan view of the mower as illustrated in FIG. 2;

FIG. 4 is a somewhat enlarged fragmentary front elevational view similar to FIG. 2; and FIG. 5 is a transverse vertical sectional view taken along the line 5—5 of FIG. 3.

Briefly, the present invention contemplates an improved mower for cutting vegetation such as hay, tall grass, weeds, crops and the like, which may be growing on irregular surfaced terrains and where solid objects may be encountered which would otherwise damage a conventional mower. Such a mower is adapted to be connected to a vehicle, such as a tractor, with the mower disposed at one side of the tractor. While the mower could also be self-propelled, it will be described hereinafter as being adapted to be drawn by a tractor.

The mower generally comprises an elongated relatively narrow frame or casing extending transversely or laterally of the direction of movement thereof. A plurality of longitudinally spaced rotatably driven shafts are carried by the frame with their axes of rotation disposed in the direction of movement of the mower. At least one end of each shaft projects outwardly of the frame and radially extending blade means is mounted on each projecting end. The projecting ends of the shafts preferably extend alternately forwardly and rearwardly of the frame, and the axes of rotation of the shafts are spaced from each other so that the cutting arcs of the blade means on the forward and rearward sides of the frame overlap each other to assure a uniform cut.

In order to prevent damage to the blade elements of each blade means when a rock or other solid object is encountered, a novel mounting arrangement for the blade elements is provided. Thus, the blade means includes a plate secured to the projecting end of a shaft, the blade elements being pivotally secured at one end thereof to the plate, eccentrically of the latter. The plate is sufficiently large to permit the blades to pivot within the perimeter of the plate and thus escape damage on contact with such an object. Rotation of the blade means is effected by a common drive which includes a sprocket rigidly secured to each shaft and an endless chain meshed with the sprockets. The sprockets and chain are mounted within the elongated casing, which is hollow and provides a sump for lubricant and the chain dips into the lubricant for lubricating the drive means during operation of the mower.

The mower also includes a novel support arrangement for the frame or casing for positioning the frame or casing in a plurality of adjusted elevated positions above the ground, and for preventing scalping when a mound or elevated area is encountered. Thus, a pair of wheels is provided, one at each end of the frame and on opposite sides thereof. Another or third wheel is also provided and carried centrally of the frame and in a position normally out of engagement with the ground. The third wheel is adapted to engage mounds or other elevated areas traversed by the mower to raise the mower and prevent scalping of such areas. Manually adjustable means is provided for varying the position of the wheels relative to the casing to control the height of cut of the mower, such means being mounted on the mower casing and accessible upon pivotal movement of the casing about one end thereof to a generally upright position adjacent the tractor within reach of the driver.

The blade means at each end of the frame overlaps the path of travel of the adjacent wheel, and the wheel at the outer end of the frame is located behind the frame. Thus, the blade means at the outer end of the frame effects cutting of the vegetation before the latter is crushed by the wheel. The blade means at the inner end of the frame is located at the rear side of the frame with the wheel in front of the frame but in mowing, the wheel at the inner end is held on the edge of the roadway or of a previously cut swath so that the wheel does not flatten any uncut vegetation. The rotation of the blade means both at the inner and outer ends of the casing is inwardly at the bottom of their cutting arcs so that no debris is thrown outwardly of the path of travel of the mower.

In FIG. 1 of the drawings, a mower embodying the features of the present invention is illustrated as connected to the side of a vehicle, in this instance a tractor T. The connection of the mower to the tractor T is such as will permit pivotal movement of the frame through a range of positions as shown in FIG. 1. The mower thus comprises an elongated relatively narrow frame 11 adapted to be pivotally connected, at its inner end 12, to the side of the tractor T. Thus, the downwardly inclined position of the frame 11, illustrated in dotted line at 11a in FIG. 1, represents the position at which the frame may be disposed for mowing a downwardly sloping surface, such as a shoulder adjacent a highway. An upwardly inclined position of the frame, illustrated in dotted line at 11b, represents the position at which the frame may be disposed for mowing an upwardly sloping surface such as an embankment. The fully upright position of the frame, illustrated in dotted line at 11c, represents another operative position of the frame but the frame may be moved to this position when the mower is in transit. The full line or horizontal position of the frame is, of course, used when mowing a level area.

The frame 11 is maintained in an adjustable elevated position above the ground for effecting a desired height of cut by support means in the form of a plurality of wheels to be hereinafter described. In order to hold the frame 11 against the reaction forces of the material being mowed, a brace 14 is provided. The brace 14 is connected at one end thereof to the outer end, indicated at 16, of the frame 11 and the frame is pivotally connected, as at 17, at its other end to the tractor T.

For mowing, the frame 11 includes a plurality of blade means, each indicated generally at 18 in FIG. 1, arranged along the frame 11 and adapted to rotate in a vertical plane. Each blade means 18 comprises a vertically disposed circular disc or plate 19 having one or more blade elements 20 pivoted as at 21 adjacent one end thereof to the plate 19 eccentrically of the latter. In the present instance, two diametrically spaced blade elements 20 are provided on each plate 19. The plate 19 has such diameter and the blade elements 20 are of such length that the blade elements may pivot about their pivots 21, upon contact with an obstruction, to a position within the perimeter of the plate 19 to protect the blade elements from damage. The rotating plate 19 may ride over such an obstruction without damage.

According to the present invention, each blade means 18 is mounted on a shaft, indicated at 22, mounted in frame 11. The shafts are equally spaced from each other and alternately project forwardly and rearwardly of the frame as at 23, with the blade means mounted on the projecting ends of the shafts. Thus, the blade means 18 are arranged in alternating or staggered relation on the forward and rearward sides of the frame, with the blade means on each side of the frame lying in substantially the same plane with each other. Thus, as will be apparent from FIG. 3, four blade means 18 are mounted on the forward side of the frame 11, and four blade means 18 are mounted on the rear side. The diameter of the cutting arcs of the blade means 18 and the lateral spacing of the shafts 22 is such that the cutting arcs on each side of the frame are substantially tangent to each other. With this arrangement, an overlap between the cutting arcs of the blade means 18 on one side of the frame and the blade means on the other side is established. A scalloped cut is thus minimized.

For mounting the blade means 18, the frame 11 preferably is in the form of an elongated hollow casing. In this instance, the casing is formed by a pair of vertically spaced channels 30 and 31 (FIG. 5), the upper channel 30 having its flanges 32 extending upwardly, and the lower channel 31 having its flanges 32 extending downwardly. A pair of elongated rectangular plates 34 are secured to the flanges 32 of the channels 30 and 31 to provide the casing. A pair of shorter vertically extending channel sections 36 (FIG. 4) are provided at each end of the casing to close the open ends thereof. All joints are sealed to render the casing 11 liquid-tight for a purpose to be explained hereinafter.

For rotatably supporting each blade means 18, the shafts 22 are arranged with their axes of rotation in the direction of movement of the mower. Each shaft 22 extends between the plates 34 (FIG. 5) of the casing 11 with one end of each shaft 22 projecting outwardly of the casing to provide a mounting for a blade means 18, as heretofore described. Bearings 37 are carried by each plate 34 for journaling the shafts 22. A sprocket 38 is keyed as at 39 to each shaft 22 and is maintained in centrally spaced relation between the plates 34 by a spacer or bushing 41 and a tubular portion 42 integral with the sprocket 38. The sprockets 38 are thus in laterally spaced alignment with each other.

For rotating the sprockets 38 and thus the shafts 22 and associated blade means 18, a common drive means is provided. Such drive means in this instance comprises an endless chain 44 carried within the casing 11 and in meshed engagement with the respective sprockets 38. The chain 44 extends longitudinally of the casing 11 and sprockets 38 alternately above and below their axes of rotation (FIG. 4) so that adjacent blade means 18 rotate in opposite directions. The chain 44 at the inner end of the casing 11 meshes with a drive sprocket 46 carried by a shaft 47 rotatably mounted in bearings in the plates 34 of the casing, and the chain at the outer end of the casing meshes with an idler sprocket 48 similarly mounted on a shaft 49 carried in bearings in the casing.

Power is supplied to the drive sprocket 46 in this instance by a pulley 50 (FIGS. 3 and 4) secured to an extended end portion of the shaft 47, the pulley 50 being adapted to be connected by a belt 51 to a power takeoff (not shown) on the tractor T. The direction of rotation of the pulley 50 and the threading of the chain 44 on the sprockets 38 is such that the blade means 18 at the remote inner and outer ends of the casing 11 rotate in a direction so that the blade elements 20 are moving inwardly of the frame at the bottom of their cutting arcs to throw cut material into the swath being cut. Thus, there is no danger of debris being thrown outwardly by the blade means 18. In order to prevent cut material from falling outside the frame and from being thrown upwardly, end plates 52 (FIGS. 1 and 2) having inturned upper ends 53, are provided on the ends 12 and 16 of the frame, and a top shield 54, as shown in FIGS. 2 and 5, is provided. In order to permit adjustment of the tension in the chain 44, or removal or replacement thereof, the idler sprocket 48 is adapted to be shifted longitudinally of the casing 11. To this end, the bearings for the shaft 49 are mounted in elongated slots 55 (FIGS. 2 and 4) and are adapted to be clamped in an adjusted position in the slot.

According to the present invention, the drive sprocket 46 and the idler sprocket 48 are mounted in the casing 11 so that the lower or return run of the chain 44 is in close proximity to the lower channel 31. Lubricant such as engine lubricating oil may be introduced into the casing 11 so that the lower run of the chain, or at least a portion thereof, is at all times immersed in lubricant. As the chain traverses the sprockets, lubricant will be transported by the chain 44 to the sprockets and shaft bearings 37 to effect lubrication of the drive mechanism.

As previously mentioned, the mower includes a novel support means for supporting the frame in an elevated position above the ground to control the depth of cut of the blade means. In the present instance, such support means comprises a pair of wheels 56 and 57, the wheel 56 being positioned adjacent the inner end 12 of the frame 11, and the wheel 57 being positioned adjacent the outer end 16 of the frame. Both wheels 56 and 57 are located so as to ride within the cutting arcs of the blade means 18 at the remote inner and outer ends of the frame. The inner wheel 56 is mounted forwardly of the frame 11 and the outer wheel 57 is mounted rearwardly thereof. Thus, the blade means 18 in front of the outer wheel 57 will cut vegetation before it is crushed by the wheels 57 passing over it. The forwardly positioned inner wheel 56 is adapted to travel within a previously mowed swath or along the edge of roadway so that the wheel does not flatten any uncut material.

Each wheel is adapted to be adjusted vertically relative to the casing 11 in order to provide an adjustment for the height of cut of the blade means 18. To this end, each of the wheels 56 and 57 is rotatably mounted on and between a pair of brackets 58 pivotally connected as at 59, to the adjacent end plate 52 and to a supporting plate 60 rigidly secured to the frame 11. The position of the brackets 58 and hence the wheels 56 and 57 is adjustable by means of linkage, indicated at 61, and manually controlled means which includes a hand crank 62. The linkage 61 includes a cross shaft 63 (FIGS. 2, 4 and 5) rotatably mounted at its ends in the plates 60 above the casing 11. The wheel bracket 58 on the inside of each wheel is connected by a link 64 to the free end of a lever 65 rigid with the shaft 63. Thus, rotation of the shaft 63 is effective to swing the wheel brackets 58 about their pivots 59 and hence change the position of the wheels 56 and 57 relative to the frame 11.

For rotating the shaft 63 to effect such adjustment, the hand crank 62 is provided. As will be apparent from FIG. 5, the hand crank 62 is supported in a threaded bearing 66 pivotally mounted between the bifurcated ends of an L-shaped bracket 67 rigidly secured at its lower end as at 68 to the casing 11. A pair of links 69 interconnect the bifurcated ends of the bracket 67 with the cross shaft 63, the latter connection being such as to accommodate relative rotational movement of the cross shaft in the links 69. The inner or right end of the crank 62, as seen in FIG. 5, is pivotally connected to the free end of an arm 70 rigid with the cross shaft 63. Thus, rotation of the crank 62 in either direction is effective to swing the lever 70 and rotate the shaft 63. Such rotation is transmitted to the wheel brackets 58 for both wheels by means of the levers 65 and links 64.

In order to prevent scalping such as would occur if the mower encountered a mound or upraised area over which the mower is moving, a third wheel 71 is provided and mounted substantially centrally of the frame 11. As shown in FIGS. 3 and 5, the wheel 71 is also rotatably mounted in and between ends 72 of levers 73 at the rear side of the frame. The levers 73 are supported intermediate their ends on the ends of a Y-shaped bracket 74 rigidly secured to the rear side of the casing 11 as at 75. A pair of arms 79 are pivotally connected at their lower ends to the other ends 81 of the levers 73 and have their upper ends rigidly secured by a cross member 82. Another arm 83 rigidly projects from the cross member 82 and is pivotally connected to the free end, indicated at 84, of a lever 86 rigid with the cross shaft 63 and is thus rotatable therewith. Thus, adjustment of the hand crank 62 to effect adjustment of the position of the wheels 56 and 57 also effects adjustment of the position of the wheel 71. The wheel 71 is positioned so as to be out of contact with the ground when the wheels 56 and 57 are in contact with a level surface. Thus, if the mower passes over a mound or upraised area between the wheels 56 and 57, the wheel 71 will contact such mound to raise the mower and thus prevent scalping. The crank 62 is so positioned on the frame 11 as will permit ready manipulation thereof by the driver of the tractor when the frame 11 is pivoted upwardly to its inoperative position 11c.

I claim:

1. A mower adapted to be supported on and moved over an area to be mowed, comprising an elongated frame, a plurality of shafts rotatably carried by said frame with their axes of rotation lying generally in the same plane and disposed transversely of said frame in the direction of movement of said mower and laterally spaced from each other, the shafts projecting alternately beyond the respective sides of the frame radially extending blade means mounted on said projecting ends, and common drive means disposed within said elongated frame intermediate the cutting planes defined by the blade means on said alternately extending shafts for rotating said blade means.

2. A mower according to claim 1, in which said shafts are spaced longitudinally of said frame so that the cutting arcs of the blade means on each side of said frame are substantially tangent to each other, the shafts having their projecting ends on one side of the frame being offset relative to the shafts having their projecting ends on the other side of said frame.

3. A mower according to claim 2, in which said shafts are equally spaced from each other.

4. A mower according to claim 1, in which the blade means on each side of said frame lie in substantially the same plane with each other.

5. A mower according to claim 1, in which each of said blade means comprises a plate secured to the projecting end of its associated shaft, and at least one blade element is pivotally secured adjacent one end thereof to said plate eccentrically of the latter.

6. A mower according to claim 5, in which said plate has a diameter such that said blade element may pivot about its secured end to a position within the perimeter of said plate to prevent damage thereto.

7. A mower according to claim 5, in which a plurality of blades are secured to said plate at spaced points thereon.

8. A mower according to claim 1, wherein said common drive means for rotating said blade means comprises a sprocket mounted on each shaft, an endless chain meshed with said sprockets, and a drive sprocket carried by said frame and meshed with said chain, said drive sprocket being adapted to be connected to a source of power for driving said chain.

9. A mower according to claim 8, in which said drive sprocket is carried at one end of said frame, and said drive means includes an idler sprocket carried at the other end of said frame in meshed engagement with said chain.

10. A mower according to claim 9, in which said chain engages said shaft sprockets alternately above and below the axes of rotation thereof so that adjacent blade means rotate in opposite directions.

11. A mower according to claim 10, in which said chain so engages the sprockets on the shafts located adjacent the longitudinal ends of said frame that the blade means at the the ends of said frame are moving inwardly at the bottom of their cutting arcs to throw cut material inwardly of said frame.

12. A mower according to claim 11, in which end plates having inturned upper ends are mounted on the ends of said frame to confine cut material within the path of movement of mower.

13. A mower according to claim 8, in which said frame comprises an elongated hollow casing, and said sprockets and said chain are disposed within said casing.

14. A mower according to claim 13, in which said casing is adapted to contain lubricant, and said chain has a portion thereof extending longitudinally of said casing adjacent the bottom wall thereof for immersion in said lubricant for lubricating said drive means.

15. A mower according to claim 1 wherein said blade means includes at least one blade element rotatable in a vertical plane with a portion of the cutting arc thereof extending below said frame, and means for supporting said frame at each end thereof in a predetermined position above said surface.

16. A mower according to claim 15, in which said support means comprises a pair of wheels carried by said frame, one forwardly of said frame and the other rearwardly of said frame.

17. A mower according to claim 16, in which said pair of wheels are located adjacent the respective ends of said frame, and the cutting arc of one of said blade means overlaps the path of travel of each wheel.

18. A mower according to claim 17, in which the wheel at the outer end of said frame is located rearwardly of said frame whereby the blade means overlapping the path of said wheel has cut material before the latter is crushed by said wheel.

19. A mower according to claim 18, in which the inner wheel is located forwardly of said frame and has a path of travel adapted to lie within a previously mowed swath.

20. A mower according to claim 16, in which said support means includes a third wheel mounted on said frame between said pair, said third wheel being normally elevated above said pair such that said third wheel will engage elevated areas in the surface being mowed to prevent scalping.

21. A mower according to claim 20, in which means is provided for adjusting the positions of said wheels relative to said frame.

22. A mower according to claim 21, in which said adjusting means comprises a cross shaft rotatably mounted on said frame and extending longitudinally thereof, bracket means pivotally secured to said frame and rotatably supporting said wheels, linkage interconnecting said cross shaft and said bracket means, and means for rotating said cross shaft.

23. A mower according to claim 22, in which said frame has a pivotal connection adapted to be connected to said vehicle for permitting adjustment of said frame from a generally upright inoperative position downwardly through a range of positions to a position at an angle below the horizontal, for mowing areas inclined to the area over which the mower travels.

24. A mower according to claim 22, in which said means for rotating said cross shaft includes a manually operable crank for controlling said linkage, said crank extending rearwardly of said frame, and said frame being adapted to be pivotally connected to said vehicle and movable through a range of positions including a generally upright position, and said crank being operable by the driver of the vehicle when said frame is in said upright position.

References Cited in the file of this patent

UNITED STATES PATENTS

| | | |
|---|---|---|
| 2,569,307 | Haapala | Sept. 25, 1951 |
| 2,777,272 | Smith et al. | Jan. 15, 1957 |
| 2,782,585 | Hervey | Feb. 26, 1957 |
| 2,872,770 | Murphy et al. | Feb. 10, 1959 |
| 2,902,814 | Lewis et al. | Sept. 8, 1959 |
| 2,909,884 | Knarzer | Oct. 27, 1959 |
| 2,926,478 | Jepson | Mar. 1, 1960 |

FOREIGN PATENTS

| | | |
|---|---|---|
| 850,787 | Great Britain | Oct. 5, 1960 |